UNITED STATES PATENT OFFICE 2,518,355

METHOD IN THE PRESERVATION OF PREPARATIONS OF LACTOBACILLUS ACIDOPHILUS

Erik Günnar Mejlbo, Charlottenlund, Denmark, assignor to A/S Enico, Copenhagen, Denmark No Drawing. Application February 11, 1946, Serial No. 646,955. In Denmark May 19, 1941

Section 1, Public Law 690, August 8, 1946
Patent expires May 19, 1961

4 Claims. (Cl. 195—59)

No method has hitherto been known by which therapeutically active lactic acid bacteria may be preserved for a longer time in a viable state without great losses. For this reason preparations of such bacteria must ever be produced afresh from original cultures or precultures within a few days previous to their use, while on the other hand cultures, which have already been set out, must be destroyed, if no application can be found for the preparations within very few days after the culture has reached the stage of development suited for the purpose.

It has now proved that the said drawbacks may be remedied and that, when the method is used in accordance with the present invention, such bacteria preparations may be preserved, as far as regards Lactobacillus acidophilus at any rate, for a longer period.

The present invention is based on the observation that on being frozen down to very low temperatures, e. g. temperatures from —10° to —80° C. or below that, preparations of the said bacteria in a sodium chloride solution cannot only stand this freezing per se but may moreover in this state be preserved through a seemingly unlimited period without any perceptible reduction in vitality. This is so much the more surprising as experiments have proved that on being frozen down to —6° to —8° C. the vitality of the same bacteria is reduced very heavily.

In conformity with this, the present method for the preservation of preparations of Lactobacillus acidophilus is characterized in that the said bacillus is incorporated in a sodium chloride solution, said solution then being stored at a temperature below —10° C., e. g. between —10° C. and —80° C.

According to the invention it has proved especially advantageous to freeze down the preparation to about —25° C. and store it at this temperature. At being thawed up after even months of storage in this way the bacteria show practically speaking the same vitality as at the production of the preparation.

Scientific investigations have formerly been made into the power of resistance of various micro-organisms, amongst others Lactobacilli from berries and peas, against low temperatures, cp. Berry, Journal of Bacteriology, 26, pp. 459–70 (1933), Berry, Science, 77, No. 1997, pp. 350–51 (1933), and Tschistjakow, Microbiol. 6, F. 6, pp. 823–24 (1937). These investigations yielded the result that in a sugar solution the said preparations were better preserved at about —20° C. than at about —10° C., whereas in a sodium chloride solution they were the worse preserved the lower the temperature (scope of investigation 0° C. to —20° C.). In Tschistjakow's opinion the difference in power of resistance in sodium chloride- and sugar-solutions is due to the difference in the value of the eutectic point for these two solutions.

Considering what is known, it is surprising that, as it has proved in accordance with the invention, suspensions of Lactobacillus acidophilus in a sodium chloride solution can stand cooling down to temperatures below —10° C., contingently down to —80° C., without the number of bacteria being perceptibly reduced.

In carrying out the method, one may in accordance with the invention preferably proceed in the manner that the preparation is frozen down in the form of bacteria, which have been separated from a pure culture by centrifugation. According to the invention these bacteria are most expediently distributed in physiological sodium chloride, in which the bacteria density is several or contingently many times as large as the concentration of the bacteria in the cultures, of which they are produced. The bacteria may thus be concentrated on a volume that is 10–50 times less than the volume of a culture containing the same number of bacteria, whereby the number of bacteria per cm.$^3$ of the carrying fluid may have a value of one thousand millions or more, ascertained biologically by sowing in dilution on a suitable substratum, as e. g. milk. On account of the strong concentration only a comparatively small cold storage space is required.

The preparations stored in the said way may, as finished preparations are needed, be added to the latter in pre-determined quantities, so that the baceteria density desired is attained.

The carrying substance in the preparations, which can be produced from the preparations stored as semi-products, may be milk, chocolate, ice-cream, cream caramels, chewing gum, soda water, beer, honey, marmalade, or clotted cream.

On account of the possibility attained through the invention of a very long storage of the said preparations these may now be produced in large quantities at a time and be kept in refrigerators at the said temperatures, until they are to be used, so that they can be made the subject of a larger and more profitable manufacturing, and they may furthermore be exported any distance, the necessary cooling being effected during the transport.

I claim:

1. A method for the preservation of Lactobacil-

*lus acidophilus* for a long period of time whereby at the end of such time period a bacteria count is afforded substantially undiminished from the original count, comprising incorporating the said bacillus into a sodium chloride solution and storing the said solution at a temperature below —10° C.

2. A method for the preservation of *Lactobacillus acidophilus* for a long period of time whereby at the end of such time period a bacteria count is afforded substantially undiminished from the original count comprising storing a suspension of the said bacillus in sodium chloride solution at a temperature between —10° C. and —80° C.

3. A method for the preservation of *Lactobacillus acidophilus* for a long period of time whereby at the end of such time period a bacteria count is afforded substantially undiminished from the original count, comprising suspending the said bacillus in a sodium chloride solution and maintaining the said suspension at a temperature of about —25° C.

4. A method for the preservation of *Lactobacillus acidophilus* for a long period of time, whereby at the end of such time period a bacteria count is afforded substantially undiminished from the original count, comprising obtaining a pure culture of the said bacillus by centrifugation, suspending the said bacillus in a sodium chloride solution and storing the said suspension at a temperature between —10° C. and —80° C.

ERIK GŪNNAR MEJLBO.

REFERENCES CITED

The following references are of record in the file of this patent:

Berry, J. of Bacteriology, 26, 459–70 (1933).
Berry, Science, 77, pp. 350–51 (1933).
Fruit Products Journal (1933) vol. 13, pages 109 to 113, by Wallace and Tanner.